July 4, 1961  E. B. GABY  2,990,872
APPARATUS FOR MOLDING LAMINATES
Filed Dec. 9, 1960

EUGENE B. GABY
INVENTOR.

BY Herbert J. Brown
ATTORNEY

United States Patent Office 2,990,872
Patented July 4, 1961

2,990,872
APPARATUS FOR MOLDING LAMINATES
Eugene B. Gaby, 2025 E. Rosedale, Fort Worth, Tex.
Filed Dec. 9, 1960, Ser. No. 74,928
3 Claims. (Cl. 154—1)

This invention relates to laminating presses for decorative members and facing panels as used in the building trades and has reference to apparatus for applying laminating pressures and achieving suitable contact between a compression plate and a work piece by acquiring a vacuum within a quick opening airtight vessel.

Effecting bonding of protective resinous sheets or decorative veneers to plywood panels requires the application of evenly distributed bonding pressures over areas to be laminated and may also require a substantially uniform application of heat. Warping, wrinkling or eventual separation between members may result from unequal distribution of bonding pressures or from lack of uniformity and simultaneity in the curing of a bonding agent. In order to achieve uniform laminating pressures between surfaces to be joined presses utilizing rigid frames forced toward one another by a plurality of screw jacks each requiring adjustment with a torque wrench or hydraulic jacks coupled to a common pressure tank and each adjusted for mechanical locking in extended position have been used. While these devices accomplish their intended result and are capable of producing laminated products of superior quality, the time required to insert one or more work pieces and adjust a press therefor, leads to excessive labor costs and leaves much to be desired by way of production capacity in custom manufacturing and job order shop operations. Maintenance of constant pressure by mechanical means presents still another problem. Plywood is not absolutely rigid but is susceptible to a limited degree of deformation in its thickness when subjected to prolonged pressures at its opposite sides; pressures originally set by screw jacks and torque wrenches tend to be offset by this deformation so that original pressure settings do not necessarily correspond to the laminating pressures acting on a board immediately prior to its removal from a press. So long as the deformation is uniform throughout a plywood sheet, losses of laminating pressures may have no detrimental effect, but in some grades of plywood the deformation may vary over the board and lead to the aforementioned detrimental results of unequally distributed laminating pressures.

A third method of applying uniform surface pressures to work pieces for laminating involves the positioning of a work piece between a rigid surface on one side and an inflatable bladder on the other. Although this method entails the constrution and manipulation of a casing to hold the bladder rigidly against the work piece which presents special problems in itself, one of the more notable drawbacks of this system involves maintenance of constant pressure when the work piece is being heated.

Accordingly, an object of the present invention is to provide laminating apparatus devoid of a multiplicity of screw jacks or adjustment devices.

Another object of the invention is to provide a laminating press which is substantially self aligning and which will assure uniform laminating pressures over the surface of a work piece.

A further object of the invention is to provide a quick acting laminating press into which a work piece or pieces may be easily inserted and removed and which requires a minimum of labor and tension in its use.

Another object of the invention is to provide a laminating press which may be easily adapted to receive and laminate materials of various thicknesses.

A further object of the invention is to provide a pneumatically operated laminating press which is inherently self-sealing and which will promote the maintenance of constant pressure upon a work piece.

An additional object of the invention is to provide a vacuum operated laminating press provided with an integral work piece heating means therein.

These and other objects will become apparent from the following description and the accompanying drawing, wherein.

Figure 1:
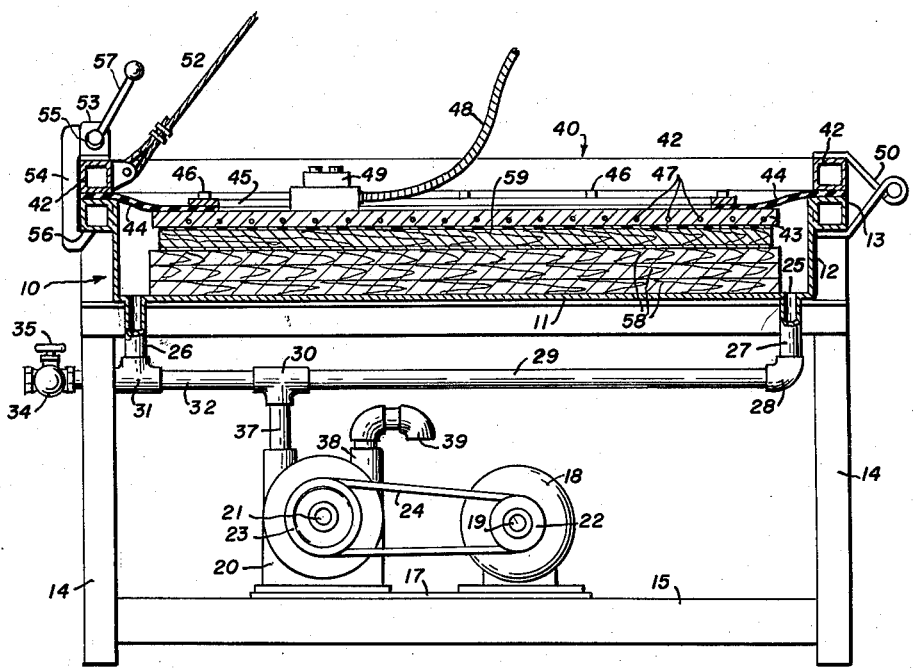
FIGURE 1 is a partially sectional side elevational view of the invention shown in a typical laminating operation.
Figure 2:
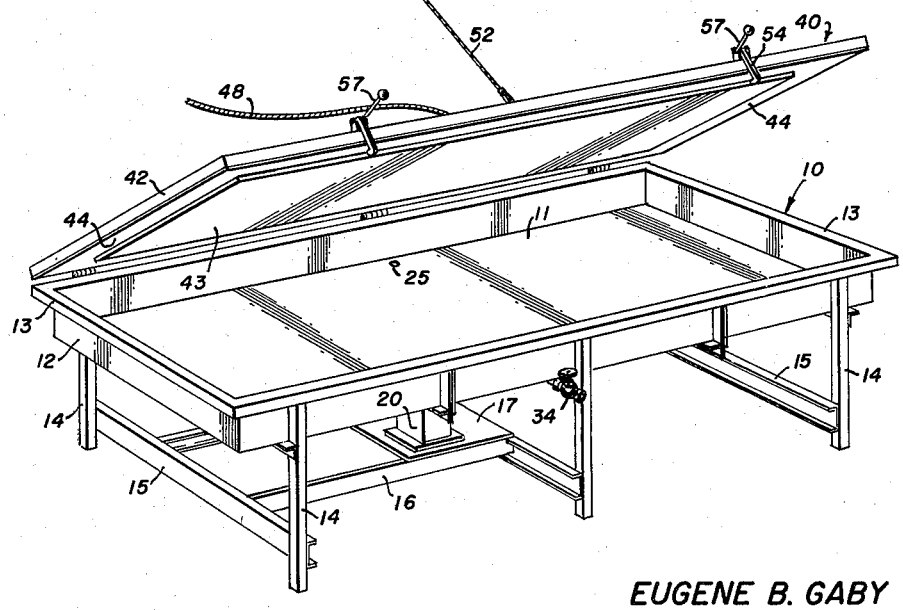
FIGURE 2 is a perspective view of the invention shown in its non-operating or open position.

In the drawing, a box-like metal basin 10, provided with a flat and rectangular base 11, is constructed of steel plates and is positioned above and parallel with the ground. Four vertical sides 12 of the basin 10 are contiguously formed being joined in sealing contact with one another at their vertical edges and being, likewise, attached to the perimeter of the base 11 from which they extend upwardly and equidistantly to define, by their upper edges, a plane which is parallel with the upper surface of the rectangular base 11. A hollow lip 13 having a substantially flat upper surface which is coplanar with the upper edges of the sides 12 is attached to the sides exteriorly of the basin 10 and is coextensive with the perimeter thereof. A plurality of vertical supports 14 are arranged in two parallel rows at opposite sides of the basin 10 and are attached to the sides and secured to the lower surface of the lip 13 from which they extend downwardly to the ground. Lateral braces 15 are spaced from and positioned beneath the box-like basin 10 and are attached to and extend between corresponding vertical supports 14 at opposite sides of the basin. Between two next adjacent lateral braces 15 a pair of longitudinal braces 16 are positioned in parallel relationship with the ground and are attached at their opposite ends to the lateral braces 15 between which they extend. A platform 17 is positioned upon and spans the longitudinal braces 16 and is welded to the upper surfaces thereof as well as the upper surface of one of the lateral braces 15. A motor 18 including a drive shaft 19 is mounted on the platform 17, and a vacuum pump 20, including a driven shaft 21, disposed with its axis parallel with the axis of the drive shaft 19 of the motor 18 is also positioned upon and secured to the upper surface of the platform 17 where it is spaced from the motor. Corresponding ends of the drive shaft 19 of the motor 18 and the driven shaft 21 of the vacuum pump 20 are respectively provided with sheaves 22 and 23 which engage a continuous belt 24 extending therebetween.

Intake orifices 25 are formed through the rectangular base 11 of the box-like basin 10 and communicate with forward and rear section lines 26 and 27 projecting downwardly from the underside of the basin. An elbow fitting 28 threadedly engages the lower end of the rear section line and also threadedly engages a horizontal manifold line 29 which is connected at its other end to a T joint 30 positioned above the vacuum pump 20. A second T joint 31 communicates the forward suction line 26 with an auxiliary manifold line 32 extending between and threadedly engaging the second T joint 31 and the first T joint 30. A nipple 33 is connected to the remaining opening in the second T joint 31 and a valve 34 is connected to the projecting end of the nipple 33 and is positioned forwardly of the box-like basin 10; the valve 34 is provided with a handle 35 for manual operation. The first T joint 30 is communicated with the intake port 36 of the vacuum pump 20 by an intake fitting 37, it being understood that a check valve (not shown) is integrally constructed with the vacuum pump at its intake port or is interposed between the intake fitting and the intake port of the vacuum pump. The exhaust port 38 of the vacuum pump 20 communicates with an exhaust pipe 39 directed away from the underside of the box-like basin 10.

A lid 40 having longitudinal and lateral dimensions substantially identical with those of the lip 13 of the box-like basin 10 is positioned thereabove and is formed as a rectangular frame member 42 constructed of a hollow box beam forming adjacent ends and sides of the lid and having flattened lower edges in a common plane. A rectangular compression plate 43, of less length and width than both the lid 40 and basin 10, is positioned with its outer edges inwardly spaced from the inner edges of the frame 42 so that the compression plate 43 is positioned within and surrounded by the frame 42 of the lid 40. An annular diaphragm 44 is constructed of resilient material such as vulcanized rubber and has its upper surface cemented to the flattened lower surface of the frame 42 so that the outer limits of the frame 42 and the outer peripheral edge of the diaphragm 44 are in substantial alignment with one another. A rectangular rim 45 is positioned adjacently above the inner edges of the diaphragm 44, and a plurality of bolts 46 pass through corresponding openings in the rim 45 and diaphragm 44 and threadedly engage the compression plate 43; thus, the diaphragm is held in compression between the rim 45 and the compression plate 43 and makes sealing contact with the upper surface thereof. Embedded within the compression plate 43, a plurality of heating elements 47 are positioned and extend generally longitudinally therein and are each connected to an electrical conduit 48 through a push button switch 49. Spring hinges 50 connect corresponding longitudinal edges of the lid and box-like basin 10 to one another and urge flattened surfaces of the lip 13 of the basin 10 and the frame 42 of the lid 40 against opposite sides of the diaphragm 44 extending therebetween. At the side of the basin opposite the spring hinges 50 a bracket 51 is attached to the frame 42 of the lid 40 and a cable 52 engaging the bracket 51 is connected to a counterbalancing system (not shown) such as a pulley and counterweight. A pair of latch brackets 53 are attached to the upper side of the frame 42 of the lid 40 near the edge thereof opposite the spring hinge 50 and a latch arm 54 is pivotally engaged at one of its ends by a cam 55 extending horizontally through and journaled to the bracket 53; the extending end of the latch arm 54 includes a clamping face 56 adapted for demountable engagement with the underside of the lip 13 of the boxlike basin 10. Levers 57 are perpendicularly attached to each cam 55.

In operation, flat spacer blocks 58 are placed within the box-like basin 10 upon the rectangular base 11 thereof and a work piece 59 is placed upon the uppermost spacer block 58. The lid 40 is then closed upon the box-like basin 10 and clamped in its closed position by the latch arms 54 which are tightened by the cams 55 and levers 57. The motor 18 is then started and the vacuum pump 20 exhausts the interior of the box-like basin 10. The rim 45 holds the inner edge of the diaphragm 44 in sealing engagement with the upper side of the compression plate 43 and the frame 42 of the lid 40 holds the outer edge of the diaphragm 44 in sealing engagement with the flattened upper surface of the lip 13 of the box-like basin 10. As air is drawn from within the basin 10 through the suction lines 26 and 27, manifolds 29 and 32 and intake fitting 37, the diaphragm 44 is pushed downwardly by atmospheric pressure against the upper surface of the compression plate 43 and the lip 13 of the box-like basin 10 so that the sealing engagement made by the diaphragm with these members is further secured and augmented. As air pressure is reduced within the basin 10 a partial vacuum is created in the space around the spacer blocks 58 and work piece 59 and may also be created within these parts if they are sufficiently porous and permeable; the compression plate 43 is, consequently, forced downwardly by atmospheric pressure upon the work piece and parts to be bonded together are forced toward one another under substantially uniform and evenly distributed pressures. By operation of the switch 49 the heating elements 47 may be connected to a source of electrical power and the compression plate 43 which encloses the heating elements may be used as a heater. It should be noted that evacuation of the box-like basin 10 reduces heat conduction within the basin 10 and minimizes the detrimental effects of gas expansion therein. When the basin 10 has been exhausted operation of the motor 22 is discontinued and recharging of the basin is prevented by the check valve (not shown) at the intake port of the vacuum pump 20 and the manual valve 34 projecting forwardly and beneath the basin.

When the laminating process has been completed the handle 35 of the manual valve 34 is turned and air is readmitted into the basin 10. The levers 57 are then used to disengage the latch arms 54 from the lip 13 of the basin 10 and the lid may be raised with assistance of the counterbalancing cable 52.

The invention is not limited to the exemplary construction herein shown and described, but may be made in various ways within the scope of the appended claims.

What is claimed is:

1. A laminating press comprising: an airtight basin, a planar lip coextensively formed with the peripheral edge of the said basin at the open side thereof, a frame hingedly connected to said basin and shaped in substantial conformity with said lip of said basin, an annular diaphragm of resilient material attached at its outer edges to the side of said frame adjacent said lip and extending continuously therebetween, a compression plate positioned within said frame and attached in sealing engagement to the interior edges of said diaphragm, a vacuum pump including a check valve and having its intake port in communication with the interior of said basin, and a valve positioned exteriorly of said basin and communicating with the interior thereof.

2. The invention as defined in claim 1 and including: a heating element embedded within said compression plate, means connecting said heating element with a source of electrical power, and a switch interposed in said means connecting said heating element through said source of electrical power.

3. The invention as defined in claim 1 and including: a rim positioned adjacent said interior edges of said diaphragm on the side of said diaphragm opposite said compression plate, corresponding openings in said rim and said diaphragm, and a plurality of bolts extending through said openings in said rim in said diaphragm and threadedly engaging said compression plate.

References Cited in the file of this patent
UNITED STATES PATENTS

| | | |
|---|---|---|
| 2,148,704 | Merritt | Feb. 28, 1939 |
| 2,668,383 | Germany | Feb. 9, 1954 |
| 2,771,619 | Stewart | Nov. 27, 1956 |